United States Patent
Cheng (10) Patent No.: US 6,674,810 B1
(45) Date of Patent: Jan. 6, 2004

(54) METHOD AND APPARATUS FOR REDUCING PEAK-TO-AVERAGE POWER RATIO IN A DISCRETE MULTI-TONE SIGNAL

(75) Inventor: Yaqi Cheng, Rowlett, TX (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/321,523

(22) Filed: May 27, 1999

(65) Prior Publication Data (65)

(51) Int. Cl.[7] .................................................. H04K 1/02
(52) U.S. Cl. ......................... 375/296; 375/260; 375/285
(58) Field of Search ................................. 375/316, 296, 375/260, 285; 370/69.1, 110.2, 110.3, 317, 525

(56) References Cited

U.S. PATENT DOCUMENTS

| | | | |
|---|---|---|---|
| 5,623,513 A | 4/1997 | Chow et al. | 375/219 |
| 5,768,318 A | 6/1998 | Mestdagh | 375/296 |
| 5,787,113 A | 7/1998 | Chow et al. | 375/219 |
| 5,835,536 A | 11/1998 | May et al. | 375/316 |
| 6,198,778 B1 * | 3/2001 | Mestdagh | 375/296 |
| 6,310,869 B1 * | 10/2001 | Hohzman et al. | 370/335 |
| 6,424,681 B1 * | 7/2002 | Tellado et al. | 375/296 |

OTHER PUBLICATIONS

Tellado, Jose et al., "PAR Reduction in Multicarrier Transmission System", *ITU—Telecommunication Standardization Sector*, Geneva, Feb. 9–20, 1998, pp. 1–14.

Melsa, Peter, "Clipping Mitigation Techniques for G.dmt and G.lite", *ITU—Telecommunication Standardization Sector*, Geneva, Feb. 9–20, 1998, pp. 1–4.

Pickering, Paul et al., "Analog Interfaces for ADSL Systems", *Analog and Mixed–Signal Design Guide, Supplement to Electronic Systems*, Apr., 1999 pp. 14–19.

Rippin, Boaz, "On Dynamic Scaling for Clip Mitigation in ADSL, Issue II" *Standards Project T1E1.4/96–24*, Orckit Communications, Ltd., Jul. 22–26, 1996, pp. 1–9.

Bingham, J. Cioffi et al, "Draft ADSL Issue 2 Text for Dynamic Clip Scaling", *Standard Project: Asymmetric Digital Subscriber Line (ADSL), T1E1.4/97–226R1*, Sep. 22–26, 1997, pp. 1–9.

Djokovic, Igor, "Par Reduction Without Noise Enhancement", *Standards Project: ADSL Standard Issue 2, T1E1.4/ 97–270*, PairGain Technologies, Sep. 22, 1997, pp. 1–3.

(List continued on next page.)

Primary Examiner—Stephen Chin
Assistant Examiner—Kevin Kim
(74) Attorney, Agent, or Firm—McDonnell Boehnen Hulbert & Berghoff (57) ABSTRACT

A method and apparatus for reducing peak-to-average power ratio in a discrete multi-tone signal. A shaping signal is generated and added to a discrete multi-tone signal to be transmitted. The shaping signal includes tones that are outside a transmission band assigned to the discrete multi-tone signal to be transmitted. One or more filters may be used to suppress the shaping function after digital-to-analog conversion has been performed. Alternatively, echo cancellation may be performed to cancel feedback tones associated with the transmit signal and shaping signal that may occur on the receive path of a discrete multi-tone transceiver. The peak-to-average power ratio reduction method and apparatus may be used in an ADSL modem in one embodiment.

14 Claims, 8 Drawing Sheets

OTHER PUBLICATIONS

Cioffi, J., "The Entropy of a Clip (97–353)", *Standards Project T1E1.4: ADSL, T1E1.4/97–353*, Information Systems Laboratory, Sep. 22, 1997, pp. 1–4.

Tellado, Jose et al, "PAR Reduction in Multicarrier Transmission Systems", *Standards Project T1E1.4: VDSL, T1E1.4/97–367*, Information Systems Laboratory, Dec. 8, 1997, pp. 1–14.

Gatherer, Alan, et al, Clip Mitigation Techniques for T1.413 Issue3, *Standards Project: T1E1.4: ADSL Issue3, T1E1.4/97–397*, Dec. 8–12, 1997, pp. 1–7.

Whitney, Donald K. et al, "The Impact of Peak Power on Line Driver Implementation", *Standards Project: VDSL, T1E1.4/96–099*, Harris Semiconductor, Apr. 22, 1996, pp. 1–6.

* cited by examiner

METHOD AND APPARATUS FOR REDUCING PEAK-TO-AVERAGE POWER RATIO IN A DISCRETE MULTI-TONE SIGNAL

FIELD OF THE INVENTION

The present invention relates to the field of telecommunications, and more particularly, to a method and apparatus for reducing the peak-to-average power ratio in a discrete multi-tone signal, such as in a discrete multi-tone transmitter or transceiver.

BACKGROUND OF THE INVENTION

Asymmetric Digital Subscriber Line

Asymmetric Digital Subscriber Line (ADSL) is a communications technology that operates over existing twisted-pair telephone lines between a central office and a residential or business location. It is generally a point-to-point connection between two dedicated devices. ADSL supports bit transmission rates of up to approximately 6 Mbps in the downstream direction (to a subscriber device at the home), but only 640 Kbps in the upstream direction (to the service provider/central office). ADSL connections actually have three separate information channels: two data channels and a POTS channel. The first data channel is a high-speed downstream channel used to convey information to the subscriber. Its data rate is adaptable and ranges from 1.5 to 6.1 Mbps. The second data channel is a medium speed duplex channel providing bi-directional communication between the subscriber and the service provider/central office. Its rate is also adaptable and the rates range from 16 to 640 kbps. The third information channel is a POTS (Plain Old Telephone Service) channel. The POTS channel is typically not processed directly by an ADSL modem. The POTS channel operates in the standard POTS frequency range and is typically processed by standard POTS devices after being split from the ADSL signal.

The American National Standards Institute (ANSI) Standard T1.413, the contents of which are incorporated herein by reference, specifies an ADSL standard that is widely followed in the telecommunications industry. The ADSL standard specifies a modulation technique known as Discrete Multi-Tone modulation.

Discrete Multi-Tone Modulation

Discrete Multi-Tone (DMT) uses a large number of subcarriers spaced close together. Each subcarrier is modulated during training using Quaternary Phase Shift Keying, or QPSK. Training typically consists of adjusting to existing conditions in the communications connection, such as amplitude response, delay distortions, time recovery, and echo characteristics. During normal data transmission mode, the modulation used in ADSL is Quadrature Amplitude Modulation (MQAM). The data bits are mapped to a series of symbols in the I-Q complex plane, and each symbol is used to modulate the amplitude and phase of one of the multiple tones, or carriers.

In some ADSL transceivers, the symbols are used to specify the magnitude and phase of a subcarrier, where each subcarrier frequency corresponds to the center frequency of the "bin" associated with a Discrete Fourier Transform (DFT). The modulated time-domain signal corresponding to all of the subcarriers can then be generated in parallel by the use of well-known DFT algorithms called Inverse Discrete Fourier Transforms (IDFT). There are many well-known forms of the DFT and IDFT, often referred to generically as fast Fourier transforms (FFT) and inverse fast Fourier transforms (IFFT).

The symbol period in ADSL modems is relatively long compared to single carrier systems because the bandwidth available to each carrier is restricted. However, a large number of symbols is transmitted simultaneously, one on each subcarrier. The number of discrete signal points that may be distinguished on a single carrier is a function of the noise level. Thus, the signal set, or constellation, of each subcarrier is determined based on the noise level within the relevant subcarrier frequency band. The appropriate loading of each carrier is determined during initial training and analysis periods.

Because the symbol time is relatively long and is preceded by a guard band, intersymbol interference is a less severe problem than with single carrier, high symbol rate systems. Furthermore, because each carrier has a narrow bandwidth, the channel impulse response is relatively flat across each subcarrier frequency band. The DMT standard for ADSL, ANSI T1.413, specifies 256 subcarriers, each with a 4.3125 kHz bandwidth. Each subcarrier can be independently modulated from zero to a maximum of 15 bits/sec/Hz. This allows up to around 60 kbps per tone. DMT transmission allows modulation and coding techniques to be employed independently for each of the subchannels.

The subchannels overlap spectrally, but as a consequence of the orthogonality of the transform, if the distortion in the channel is mild relative to the bandwidth of a subchannel, the data in each subchannel can be demodulated with a small amount of interference from the other subchannels. For high-speed wide-band applications, it is common to use a cyclic-prefix at the beginning, or a periodic extension appended at the end of each symbol to maintain orthogonality. Because of the periodic nature of the FFT, no discontinuity in the time-domain channel is generated between the symbol and the extension. It has been shown that if the channel impulse response is shorter than the length of the periodic extension, subchannel isolation is achieved.

Signal processing is typically performed after the signal waveform is sampled. Processing associated with ADSL modems often includes echo cancellation, equalization, and DMT modulation/demodulation.

Peak-to-Average Power Ratio

Although DMT has been adopted by standards organizations for ADSL modems, DMT has some disadvantages. One of the most significant disadvantages is its large time-domain PAR (Peak-to-Average power Ratio). A large PAR requires higher resolution digital-to-analog conversion to avoid clipping of the signal, which results when a DMT signal exceeds the dynamic range of the DAC (Digital-to-Analog Converter). As resolution requirements increase, the cost of a suitable DAC increases. Similarly, when a transmitted signal having a large PAR is reflected back into the receiving path (a local echo), it causes similar problems for the ADC (Analog-to-Digital Converter). A large PAR requires higher resolution analog-to-digital conversion to avoid signal-clipping. Typically, the cost for increased resolution in an ADC is even greater than for increased resolution in a DAC. As a result of these high resolution DACs and ADCs, ADSL modems for subscriber devices, e.g., personal computers and other remote terminals, are significantly more expensive than traditional analog POTS-type modems.

One prior solution for PAR reduction is described in U.S. Pat. No. 5,787,113. This first solution generally involves limiting and truncating a DMT signal before digital-to-analog conversion occurs. An echo cancellation scheme is described to cancel noise introduced by the limiting process. However, the noise will most likely be a wide-band or white noise, which is difficult to cancel, compared to noise generated from a smaller number of frequencies.

A second prior solution for PAR reduction is described in U.S. Pat. No. 5,835,536 (inventors Michael May, Terence Johnson, and Matthew Pendleton). Variations of this second solution are discussed in Jose Tellado, John Cioffi, and Richard Stuart, "PAR reduction in Multicarrier Transmission Systems," ITU Contributions, D.150, Geneva, Feb. 9–20, 1998, and in A. Gatherer and M. Polley, "Controlling Clipping Probability in DMT Transmission," The $31^{st}$ Asilomar Conference on Signals, Systems, and Computers, Nov. 1997. This second solution generally involves using tones within the DMT transmission band to generate a magnitude adjusting symbol to add to the time-domain DMT signal to be transmitted. As the number of tones used to generate the magnitude adjusting signal increases, the reduction in PAR improves. The tones used for PAR reduction in this second solution are often tones within the transmission band that may be insufficient for supporting data transmission. However, tones used for PAR reduction cannot be used for data transmission. Therefore, if it is desired to use more tones to achieve improved PAR reduction, tones that might otherwise be used for data transmission are instead used for PAR reduction. Hence, there is a loss in data rate due to the unavailability of these tones for data transmission.

Needed is a method and/or apparatus for reducing PAR in a DMT device that results in a minimal loss of data rate. The method and/or apparatus should have a minimal effect on the signal to be transmitted, and should allow any effects the PAR reduction introduces to a received signal to be substantially cancelled.

SUMMARY OF THE INVENTION

In accordance with preferred embodiments of the present invention, some of the problems associated with PAR reduction are overcome. Methods and apparatus for PAR reduction in a DMT signal are provided.

One aspect of the invention includes a method for reducing peak-to-average ratio in a discrete multi-tone signal. First, a shaping signal is generated. The shaping signal includes frequency bands located outside a transmission band associated with a discrete multi-tone signal. The discrete multi-tone signal may be a signal that is to be transmitted across a transmission medium, for example. The shaping signal is added to the discrete multi-tone signal, resulting in a modified discrete multi-tone signal. This modified signal may then be further processed and transmitted.

In one preferred embodiment of the invention, after the signal has been modified by the shaping signal, the modified signal is converted to an analog signal, which is then filtered to suppress a shaping component associated with the shaping signal.

In another preferred embodiment of the invention, echo cancellation may be performed on a second discrete multi-tone signal, such as a signal received by a transceiver from a communications medium.

In a second aspect of the invention, a method for reducing peak-to-average power ratio in a transmit signal in a discrete multi-tone transceiver is provided. A discrete multi-tone signal is interpolated to produce an interpolated discrete multi-tone signal. Next, a peak magnitude associated with either the original signal or the interpolated signal is compared to a pre-determined magnitude parameter. If the peak magnitude exceeds the pre-determined magnitude parameter, then a shaping signal is added to the interpolated discrete multi-tone signal to produce a modified signal. In this aspect of the invention, the shaping signal consists entirely of tones located outside a transmission band allocated to the discrete multi-tone signal. Feedback tones from the shaping signal that may be introduced to a receive signal within the discrete multi-tone transceiver may be cancelled, such as by subtracting an echo cancellation parameter from the receive signal.

Another aspect of the invention includes a discrete multi-tone transmitter. The discrete multi-tone transmitter includes an Inverse Fast Fourier Transform unit, an interpolation unit, a shaping signal generator that uses tones located outside a transmission band, an adder, a digital-to-analog converter, one or more filters for suppressing the shaping signal, and an interface.

In a preferred embodiment of the invention, the transmitter is part of a transceiver that further includes an analog-to-digital converter and an echo cancellation unit. In this embodiment, the echo cancellation may be substituted for the one or more filters for suppressing the shaping signal.

The foregoing and other features and advantages of preferred embodiments of the present invention will be more readily apparent from the following detailed description, which proceeds with reference to the accompanying drawings.

BRIEF DESCRIPTION OF THE DRAWINGS

These and other objects, advantages, and features of the invention will appear for purpose of illustration, but not of limitation, in connection with FIGS. 1–15, wherein like numbers refer to like parts throughout and in which.

DETAILED DESCRIPTION OF THE PRESENTLY PREFERRED EMBODIMENTS

Figure 1:
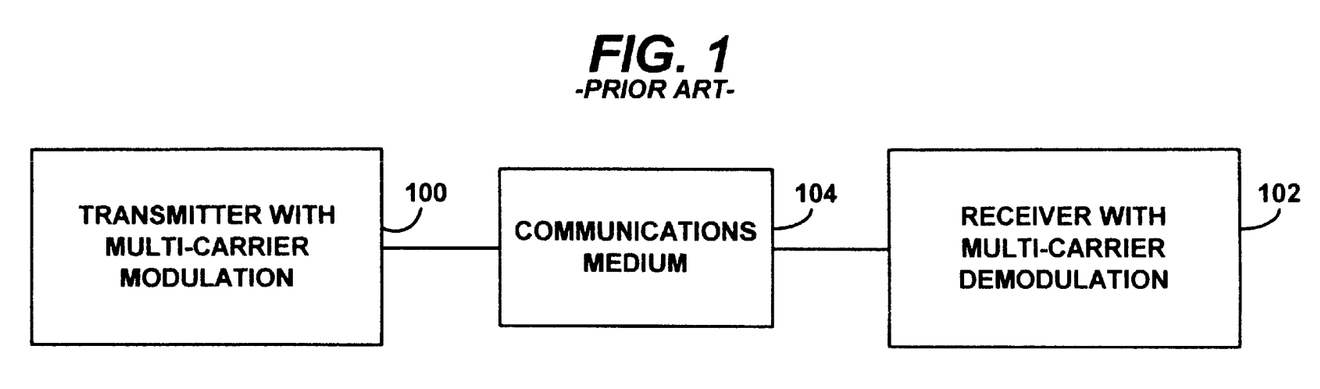
FIG. 1 is a block diagram illustrating a prior art multi-carrier communication system utilizing a preferred embodiment of the present invention.

A prior art multi-carrier communication system is shown in FIG. 1. Transmitter 100 employs a multi-carrier modulator, utilizing Discrete Multi-Tone (DMT) modulation. The DMT modulator may be implemented by mapping the data values to symbols specified by the magnitude and phase of each carrier, and then performing an inverse discrete Fourier transform (IDFT). The time domain sequence is then transmitted over a communications medium 104, which includes the effects of the subscriber line twisted pair wire and the analog components and amplifiers of the analog front ends of the transceivers. The receiver 102 includes a DMT demodulator. The demodulator may be implemented using a discrete Fourier transform (DFT), for which there are many algorithms, to recover the magnitude and phase of the symbols on each carrier. It is understood that in a typical configuration, such as a typical ADSL system, each end of the communication channel utilizes both a transmitter and receiver, making a transceiver on each end.

Figure 2:
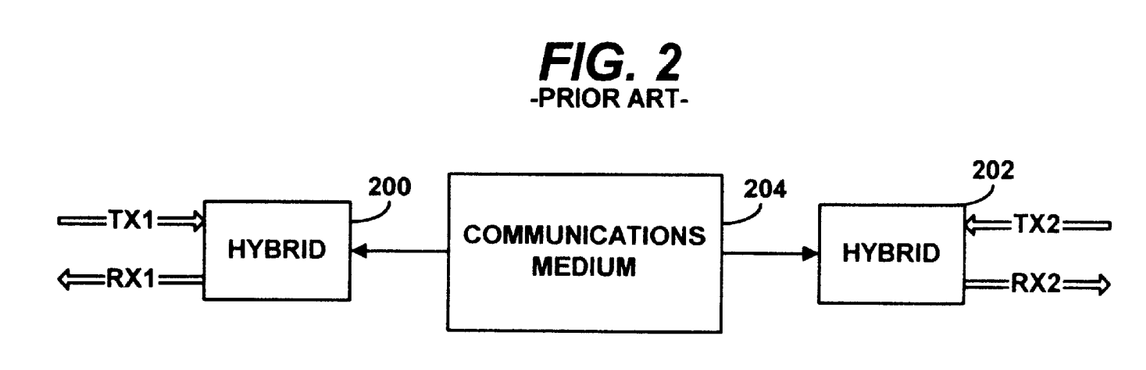
FIG. 2 is a block diagram illustrating a prior art full-duplex multi-carrier communication system utilizing a preferred embodiment of the present invention.

A prior art full-duplex multi-carrier communication system is shown in FIG. 2. A first hybrid unit 200 includes analog components and amplifiers to serve as an interface between a first transceiver (including a transmit line TX1 and receive line RX1) and a communications medium 204. A second hybrid unit 202 includes analog components and amplifiers to serve as an interface between a second transceiver (including a transmit line TX2 and receive line RX2) and the communications medium 204. In an ADSL system, the downstream transmission direction (from the central office or service provider to the subscriber) utilizes a wider bandwidth than the return direction, or upstream direction.

In a typical ADSL transceiver, incoming data signals to be transmitted are first mapped to symbols by a signal point mapper. The mapper provides complex-valued signal points (i.e., points having a real component and an imaginary component, alternatively expressed as a magnitude and phase, as is well known in the art) selected from a signal constellation. The constellation points represent the magnitude and phase of each individual carrier. Thus, these constellation points represent the modulated signal in the frequency domain. To obtain the corresponding time domain signal that is to be transmitted over the channel, an inverse discrete Fourier transform (IDFT) may be utilized to transform the constellation points to a time domain sequence.

In ADSL transmission systems, two-hundred fifty six (256) carriers may be used, thus 256 constellation points are specified by the mapper. Because the time-domain signal must be real valued, the 256 complex-valued frequency domain points are extended to a total of 512 points by using the complex conjugates of the original 256 points. The result of the IDFT modulation performed on the 512 point sequence is a real-valued time domain sequence (TDS) having a length of 512 time domain values. The time domain sequence is then processed by adding a cyclic prefix (CP) to form a frame of transmit data. As is well known in the art, the cyclic prefix is added to preserve orthogonality of the carriers even after distortion by the communications medium.

The discrete samples are converted to analog form and transmitted over the communications medium. At the distant end, a full-rate ADSL receiver samples the received signal and processes the received points by performing a discrete Fourier transform (DFT) on the 512 time domain signal samples. Of course, only the first 256 points are calculated to obtain the original constellation points. A frequency domain equalizer may then be implemented to correct for channel distortion. The frequency domain equalizer consists of a single tap filter for each carrier frequency.

Figure 3:
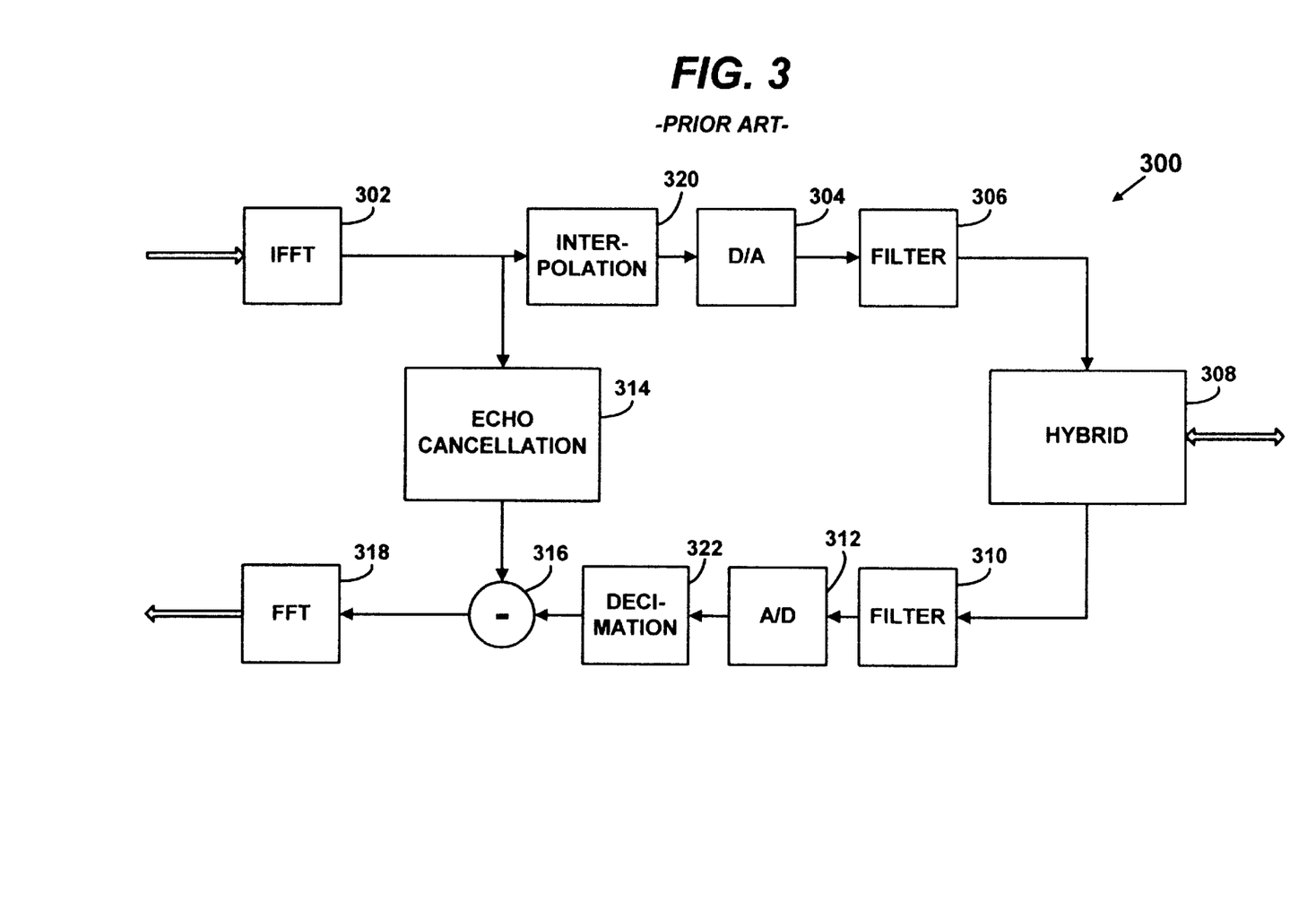
FIG. 3 is a block diagram illustrating a prior art DMT transceiver.

FIG. 3 is a simplified block diagram of a typical prior art DMT transceiver 300. A digital signal to be transmitted is first transformed from time-domain to frequency-domain by IFFT unit 302. The transformed digital signal is converted from digital to analog by a DAC (digital-to-analog converter) 304 and is coupled to the bidirectional communications medium through a filter 306 and a hybrid circuit 308. Signals received from the bidirectional communications medium a the hybrid circuit 308, filter 310, and ADC (analog-to-digital converter) 312 to be transformed from the frequency domain back to the time domain by an FFT unit 318. Some prior art transceivers also contain an echo cancellation unit 314 that is connected after IFFT unit 302 to an adder 316, located between ADC 312 and FFT 318. The echo cancellation unit is used to cancel components of the transmitted signal which may be present in the receive path. The adder 316 is shown as having a minus sign to represent the subtraction of the transmit signal component that occurs. As is well known, the echo cancellation unit 314 can have coefficients that are adapted over time to optimize cancellation. A typical prior art transceiver may also contain an interpolator 320 in the transmit path connected between the input to the echo cancellation unit 314 and the DAC 304 to assist in the digital-to-analog conversion process. Similarly, a decimator 322 may be included within the receive path connected between the ADC 312 and the adder 316 for the echo cancellation unit 314. The decimator 322 is used to assist in the analog-to-digital conversion process.

Figure 4:
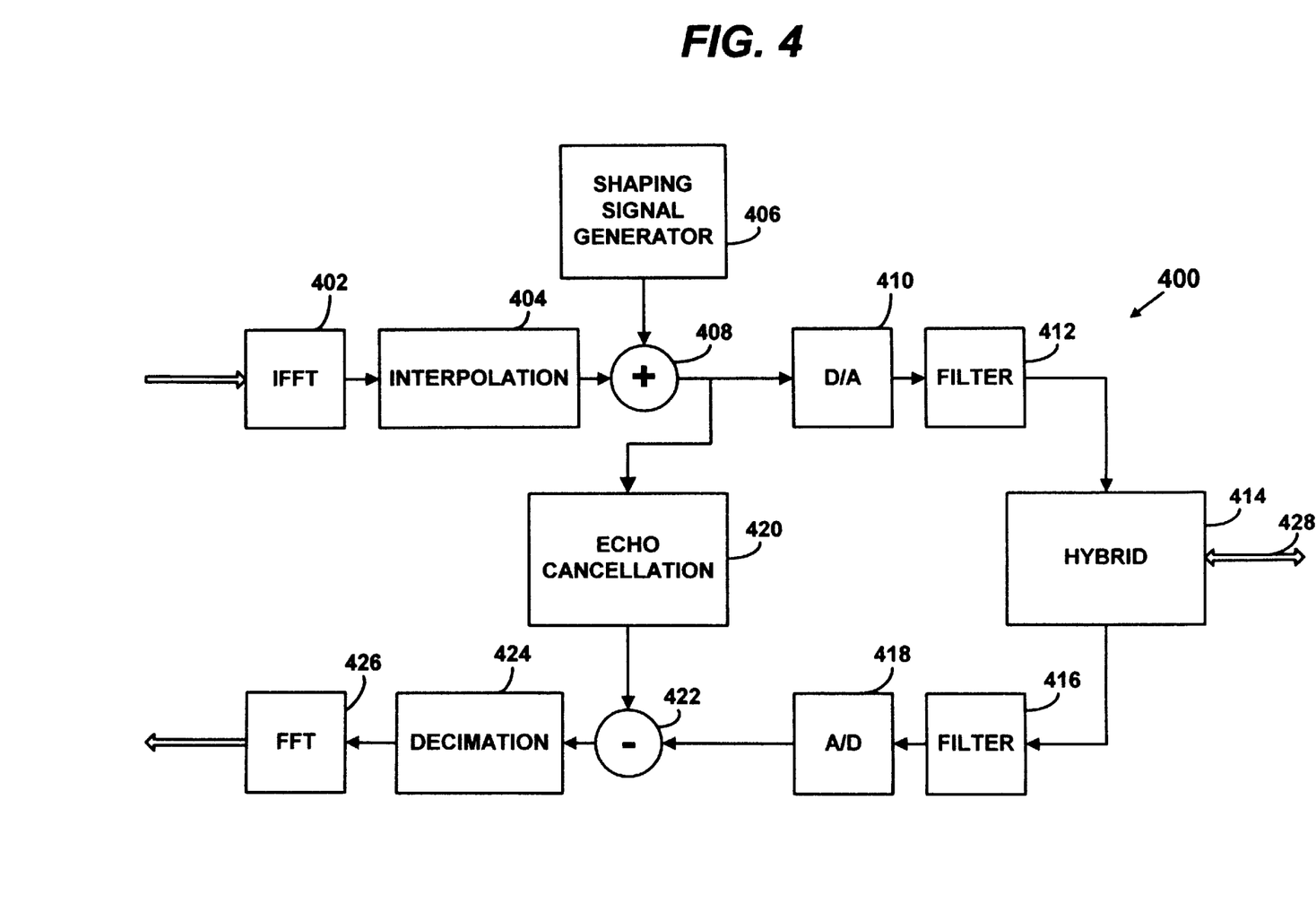
FIG. 4 is a block diagram illustrating a DMT transceiver according to a preferred embodiment of the present invention.

FIG. 4 is a block diagram showing a discrete multi-tone transceiver according to a preferred embodiment of the present invention. An encoded discrete multi-tone transmit signal is coupled to a communications medium 428 through an IFFT unit 402, an interpolation unit 404, an adder 408, a DAC 410, a filter 412, and a hybrid circuit 414. A shaping signal generator 406 serves as an input to the adder 408, allowing a shaping signal to be added to the transmit signal. A signal received on communications medium 428 flows along a receive path through a receive filter 416, an ADC 418, a receive adder 422, a decimation unit 424, and an FFT unit 426. An echo cancellation unit 420 is shown as having an input connection between the adder on the transmit path and the DAC 410. An output from the echo cancellation unit 420 is shown as being one of the inputs to the adder 422 on the receive path. The adder on the receive path is shown with a negative sign to represent that the adder input from the echo cancellation unit is likely to be negative in sign, equating to a subtraction process.

The IFFT unit 402 transforms transmit signals from a frequency domain to a time domain. Although an IFFT unit is shown, other inverse discrete Fourier transforms may also be used.

The interpolation unit 404 may be used for assisting in the digital-to-analog conversion process, but it performs an additional function in combination with the shaping signal generator 406 and the adder 408. The interpolation unit 404 is used to create frequency bands outside of the transmission band assigned to the transmit signal. For example, if signals are usually transmitted upstream in a transmission band having tones ranging from 26 kHz to 138 kHz, a one-to-two interpolation could be used to double the available frequencies to 276 kHz. A one-to-three interpolation could be used to triple the available frequencies. In the preferred embodiment of the present invention, these additional frequency bands are used for PAR reduction.

The shaping signal generator 406 is used to generate a shaping signal to be added to the transmit signal for PAR reduction, so that the DAC 410 and the ADC 418 may be of lower resolution, and therefore less expensive. The shaping signal can be generated by examining the transmit signal for amplitude peaks. Such a peak may occur as the result of combining similar time-domain contributions of frequency-domain vectors determined in the encoding process. If an identified peak magnitude exceeds a pre-determined magnitude parameter, then a shaping function can be centered on the frequency at which the identified peak magnitude occurs. The pre-determined magnitude parameter is derived from resolution characteristics of the digital-to-analog converter.

The shaping function may, for example be an opposite impulse function at the frequency at which the identified peak magnitude occurs. The addition of the opposite impulse function to the transmit signal would result in a signal have a reduced peak magnitude at the frequency where the original peak occurred. Such an impulse function can be generated by using frequency bands that are outside of the transmission band assigned to the transmit signal, by a standard, such as the ANSI Standard T1.413 for ADSL, or by some other assignment process. This differs from previous implementations that use tones within the transmission band for reducing PAR. Although some previous implementations may use tones within the transmission band that are subject to attenuation or noise (and therefore not used for transmission), these previous implementations may be limited in the number of tones that can be used for PAR reduction without reducing the data rate. Tones used for PAR reduction cannot be used for data transmission. The preferred embodiment of the present invention solves this problem by using frequency bands or tones that are outside of the transmission band. Therefore, many frequency bands can be used for PAR reduction without sacrificing data rate. Of course, it may be desirable in some cases to use tones from both inside and outside the transmission band.

The shaping signal generator may involve performing several iterations to reduce all the relevant peaks in the transmit signal. In this way, a shaping signal having frequency components may be generated. The shaping signal is then added to the transmit signal at adder 408. If there are no peaks exceeding the pre-determined magnitude parameter, then the shaping signal generator may be idle for the current signal frame. After the transmit signal has been modified by the addition of the shaping signal, it is converted from analog-to-digital by the DAC 410 and is filtered by the filter 412 on the transmit path. A hybrid unit 414 may then be used as an interface for interfacing the transmitter to the communications medium, so that the signal may be transmitted across the communications medium.

The transceiver 400 may also include receiving functionality. The above description relates to the transmitting functionality of transceiver 400, and could be implemented as part of a stand-alone transmitter.

A signal received by the transceiver 400 on the communications medium 428 enters the hybrid circuit 414 and is filtered by the filter 416 on the receive path. The received signal is converted from analog-to-digital by ADC 418, and may undergo echo cancellation and decimation before being transformed by FFT unit 426. The decimation unit 424 may be implemented to assist in the analog-to-digital conversion process.

Echo cancellation may be performed in conjunction with the echo cancellation unit 420 and the adder 422. The echo cancellation unit 420 receives as its input the signal to be transmitted as modified by the shaping signal. Well known echo cancellation techniques may be used to produce an echo cancellation parameter to cancel any reflections produced by the modified transmit signal that occur on the received signal path. The reflections may be in the form of feedback tones, which are relatively simple to cancel, compared to wide-band white noise. Whereas prior echo cancellation typically has an input from immediately after the IFFT transform unit, the echo cancellation unit of the preferred embodiment includes canceling the shaping signal components, in addition to the components associated with the original transmit signal. The appropriate echo cancellation parameter is then subtracted from the receive signal at adder 422. If echo cancellation is effective, then their may be no need to suppress the shaping signal in a filter, such as filter 412.

Figure 5:
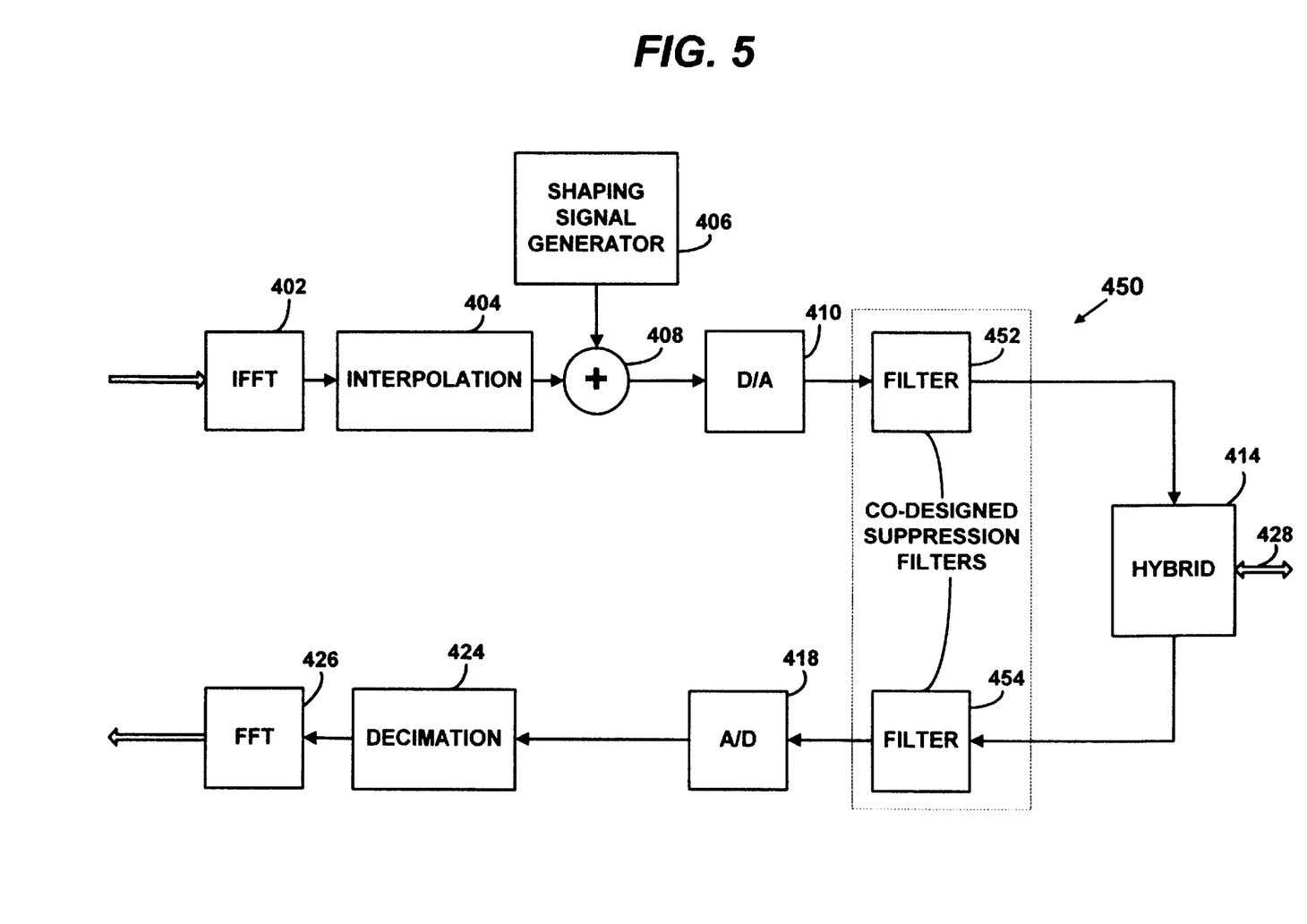
FIG. 5 is a block diagram illustrating a DMT transceiver according to a second preferred embodiment of the present invention.

FIG. 5 is a block diagram showing a discrete multi-tone transceiver according to a second preferred embodiment of the present invention. Most of the blocks in FIG. 5 are similar in function to those in FIG. 4, which is represented by the identical reference numerals. The echo cancellation unit 420 and adder 420 have been replaced by co-designed suppression filters 452 and 454. If the transceiver does not contain echo cancellation functionality as described above with reference to FIG. 4, or if echo cancellation is ineffective, filters 452 and 454 may be designed to operate in conjunction with each other. If, for example, the upstream transmission band is at relatively low frequencies and the downstream transmission band is at relatively higher frequencies, then filter 452 could be a low-pass filter, filter 454 could be a high-pass filter, and filters 452 and 454 could, in combination, define a stop-band. If the stop-band is chosen at the frequencies at which the shaping signal is located, then the shaping signal will be effectively suppressed from both the transmitted signal and the reflected local echo. This filter-suppression technique preferably uses both filters 452 and 454 to account for deviations from ideal filter characteristics due to the orthogonal nature of an encoded DMT signal and other factors. The use of such filters may allow data transmission to occur in at least a portion of those bands in which the shaping signal is located.

Figure 6:
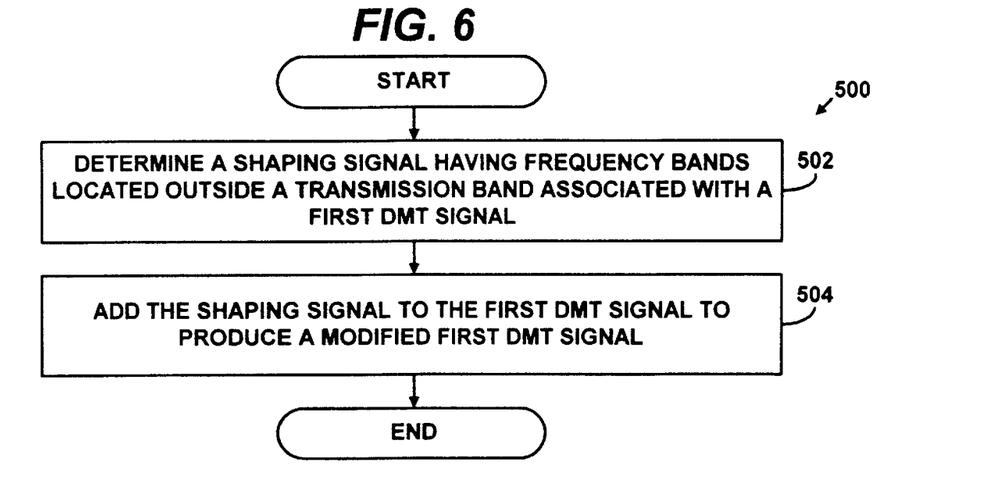
FIG. 6 is a flow diagram illustrating a method for PAR reduction of a DMT signal according to a preferred embodiment of the present invention.

FIG. 6 shows a method 500 for reducing peak-to-average power ratio in a discrete multi-tone device, according to a preferred embodiment of the present invention. A shaping signal is determined in step 502. The shaping signal includes frequency bands located outside a transmission band associated with a first DMT signal to be transmitted by a transmitter. For example, the transmission band associated with the first DMT signal may be an upstream transmission band or a downstream transmission band in an ADSL system. The shaping signal preferably consists entirely of frequency bands located outside of the transmission band, but it may also consist of a combination of frequency bands located both inside and outside of the transmission band. The use of frequency bands located outside the transmission band ensures that there is no loss in data rate, which might otherwise occur if subchannels within the transmission band are used for PAR reduction instead of data transmission. The description referencing shaping signal generator 406, interpolation unit 404, and adder 408 describes one method for generating a shaping signal. After the shaping signal has been generated using frequency bands located outside the transmission band, the shaping signal is added to the first DMT signal, as shown in step 504. This results in a modified first DMT signal, which is then in condition for digital-to-analog conversion with lessened or eliminated clipping effects.

Figure 7:
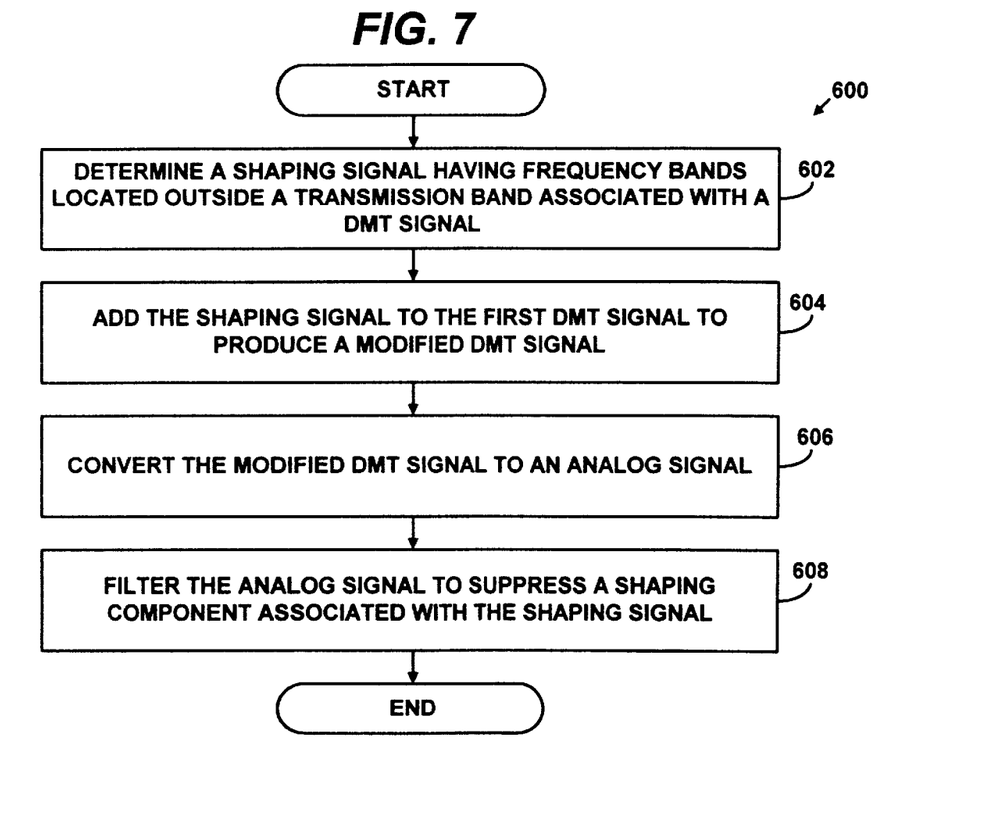
FIG. 7 is a flow diagram illustrating a method for PAR reduction in a DMT transmitter according to a preferred embodiment of the present invention.

FIG. 7 shows a method 600 for PAR reduction in a DMT transmitter according to a preferred embodiment of the present invention. Steps 602 and 604 comprise adding a determined shaping signal to a DMT transmit signal to determine a modified DMT signal. Steps 602 and 604 correspond to steps 502 and 504 in method 500. In step 606, the modified DMT signal is converted to an analog signal by a digital-to-analog converter, such as DAC 410. The analog signal is then filtered to suppress a shaping component associated with the shaping signal, as shown in step 608. The filtered analog signal is then in condition to be sent to a hybrid circuit, such as hybrid circuit 414 for transmission across a communications medium. Method 600 could be used in a DMT transmitter, such as an ADSL modem, for example.

Figure 8:
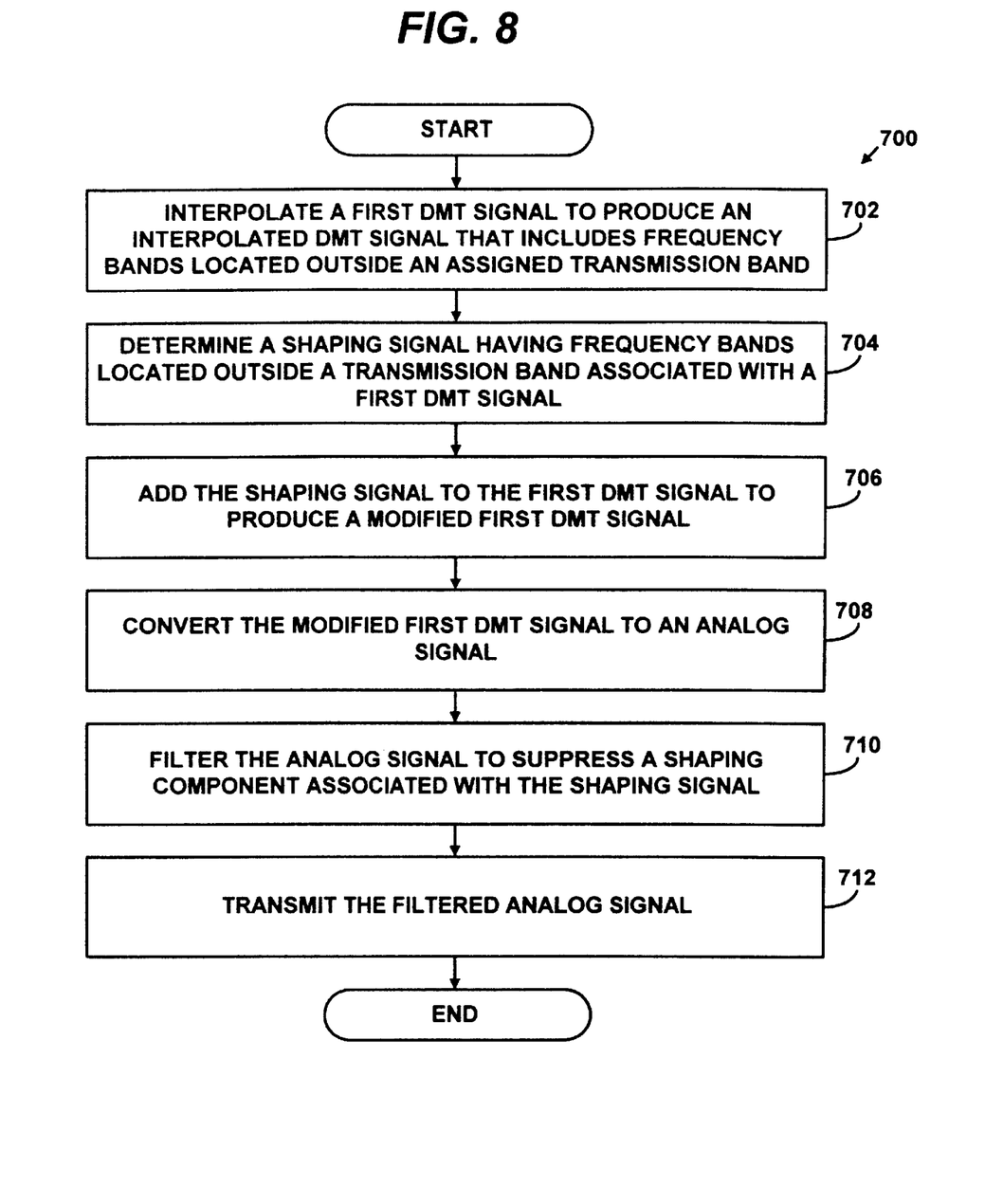
FIG. 8 is a flow diagram illustrating a method for transmitting a DMT signal according to a preferred embodiment of the present invention.

FIG. 8 is a flow diagram illustrating a method 700 for transmitting a DMT signal according to a preferred embodiment of the present invention. In step 702, a first DMT signal is interpolated to form an interpolated first DMT signal, so that additional frequency bands are available beyond those contained in a transmission band assigned to the first DMT signal. The assigned transmission band may be an ADSL upstream or downstream transmission band, for example. The description accompanying the interpolation unit 404 in FIG. 4 provides additional details about interpolation. Next, a shaping signal is determined, as shown in step 704. The determination of the shaping signal may include determining whether a peak magnitude exceeds a pre-determined magnitude parameter, where the peak magnitude is associated with either the first DMT signal or the interpolated first DMT signal. The pre-determined magnitude parameter may be derived from a specified peak-to-average ratio parameter that is dependent on characteristics of the digital-to-analog conversion process. The shaping signal can be generated from a pre-determined shaping function centered on a peak in the interpolated first discrete multi-tone signal. In the preferred embodiment, the shaping signal consists entirely of tones located outside the transmission band allocated or assigned to the discrete multi-tone signal. Next, the shaping signal is added to the interpolated first DMT signal, as shown in step 706. Step 706 might only be necessary if it is determined that the peak magnitude exceeds the pre-determined magnitude parameter. The modified first DMT signal is then converted to an analog signal and is filtered to suppress a shaping component associated with the shaping signal, as shown in steps 708 and 710. Additional details regarding filtering of the analog signal were described with reference to filters 452 and 454. Finally, the filtered analog signal is transmitted, as shown in step 712. The transmission step may require additional signal conditioning depending on characteristics of the transmission medium. The interpolation step 702 may, of course, be used with any of the embodiments described herein.

Figure 9:
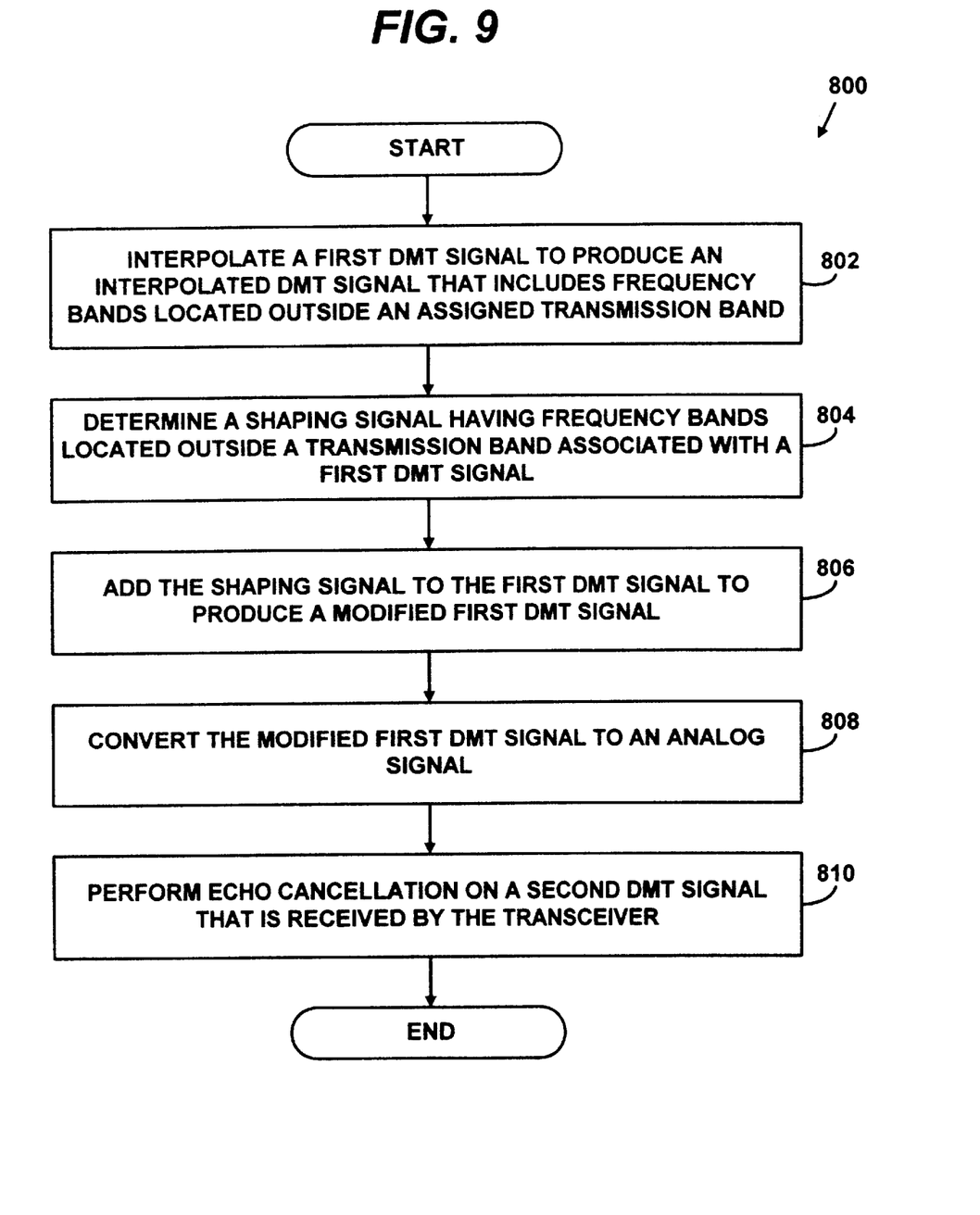
FIG. 9 is a flow diagram illustrating a method for PAR reduction in a DMT transceiver according to a preferred embodiment of the present invention.

FIG. 9 is a flow diagram illustrating a method 800 for PAR reduction in a DMT transceiver according to a preferred embodiment of the present invention. Steps 802, 804, 806, and 808 are identical to steps 702, 704, 706, and 708 in method 700. In step 812, echo cancellation is performed on a second DMT signal that is received by the DMT transceiver. In a DMT transceiver, feedback tones from a transmit signal may be reflected back along a receive path in the transceiver. An echo cancellation unit, such as echo cancellation unit 420 may be used to cancel the feedback tones from the transmit first DMT signal as modified by the shaping signal. The echo cancellation unit receives as its input the modified first DMT signal. Well known echo cancellation techniques may be used to produce an echo cancellation parameter to cancel any reflections produced by the modified transmit signal that occur on the received signal path. The reflections may be in the form of feedback tones, which are relatively simple to cancel, compared to wideband white noise. Whereas prior echo cancellation typically uses an input from immediately after IFFT transformation, the echo cancellation of the preferred embodiment includes canceling the shaping signal components, in addition to the components associated with the original transmit signal. The appropriate echo cancellation parameter is then subtracted from the receive signal to perform the echo cancellation.

Figure 10:
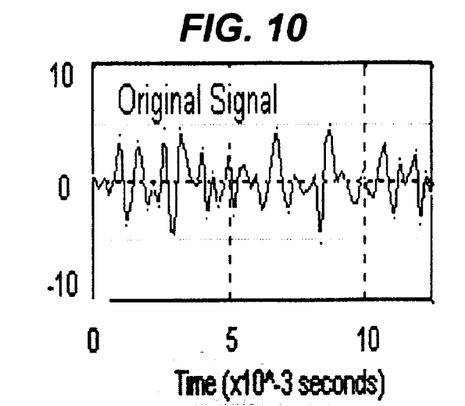
FIG. 10 is a graph showing a time-domain representation of a DMT signal before PAR reduction according to the present invention.
Figure 11:
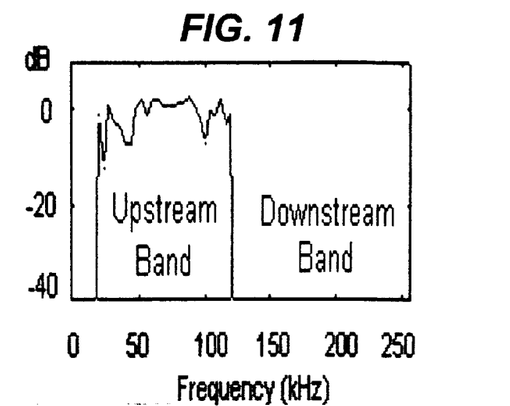
FIG. 11 is a graph showing a frequency-domain representation of a DMT signal before PAR reduction according to the present invention.

FIGS. 10 and 11 show time-domain and frequency-domain representations of a DMT signal before PAR reduction. In FIG. 10, there are several very large peaks, contributing to a high PAR. FIG. 11 shows that the tones for the DMT signal are all located within an upstream transmission band. Frequency bands outside the upstream transmission band are unused for data transmission.

Figure 12:
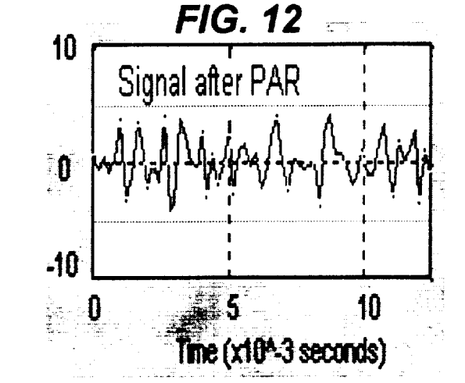
FIG. 12 is a graph showing a time-domain representation of a DMT signal after PAR reduction according to a preferred embodiment of the present invention.
Figure 13:
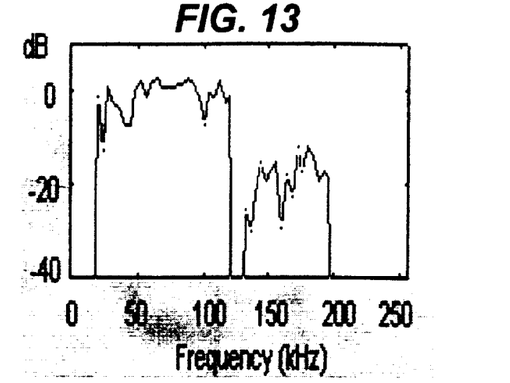
FIG. 13 is a graph showing a frequency-domain representation of a DMT signal and a shaping signal according to a preferred embodiment of the present invention.

FIGS. 12 and 13 show time-domain and frequency-domain representations of the same DMT signal as modified by many iterations of a shaping signal according to the present invention. In FIG. 12, the amplitudes of the largest peaks have been slightly decreased, enabling improved digital-to-analog conversion without excessive clipping. FIG. 13 shows the tones for the original DMT signal, as well as the frequency bands for the shaping signal. In this example, all of the shaping signal tones are located completely outside the transmission band, so that there is no loss in data rate due to some of the tones in the transmission band being used for PAR reduction. The PAR reduction frequency bands are shown as being located in a downstream transmission band. Since the shaping signal is preferably filtered out by a filter after the digital-to-analog conversion process, the shaping signal will have little effect on signals on the downstream band.

Figure 14:
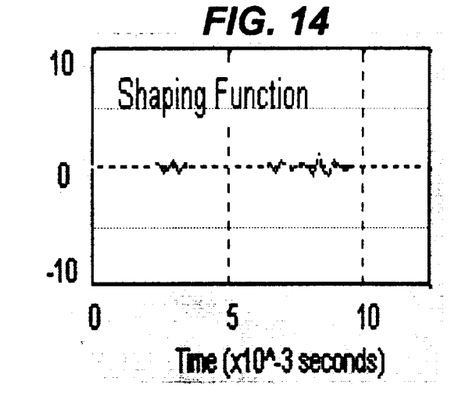
FIG. 14 is a graph showing a time-domain representation of a shaping signal according a preferred embodiment of the present invention.
Figure 15:
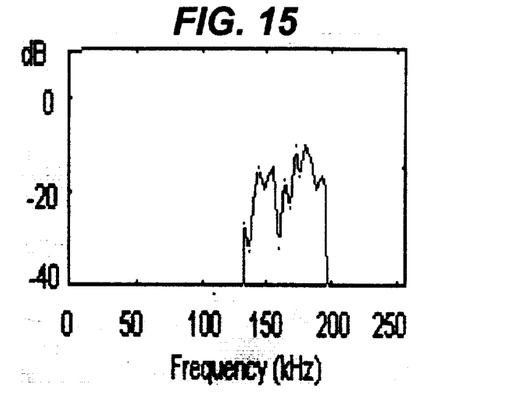
FIG. 15 is a graph showing a frequency-domain representation of a shaping signal according a preferred embodiment of the present invention.

FIGS. 14 and 15 show time-domain and frequency-domain representations of the isolated shaping signal, after many iterations. In FIG. 14, the shaping signal components are mainly centered around the peaks of the original DMT signal. In FIG. 15, the shaping signal is shown as using only frequency bands located outside the transmission band.

The PAR reduction methods described above may be implemented in a DMT transmitter or transceiver, such as in an ADSL modem. Although a PAR reducing transceiver was described that included echo cancellation, the present invention may also be implemented in a stand-alone DMT transmitter or transceiver that has no echo cancellation capabilities. Similarly other exemplary representations may be omitted in some embodiments of the present invention without departing from the intended scope of the invention.

An operating environment for components of the present invention may include a processing system with at least one high speed Central Processing Unit ("CPU") and a memory. In accordance with the practices of persons skilled in the art of computer programming, the present invention is described above with reference to acts and symbolic representations of operations that are performed by the processing system, unless indicated otherwise. Such acts and operations are referred to as being "computer-executed" or "CPU executed."

It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile (e.g., Random Access Memory ("RAM")) or non-volatile (e.g., Read-Only Memory ("ROM")) mass storage system readable by the CPU.

Preferred and alternative embodiments of the present invention have been illustrated and described. It will be understood, however, that changes and modifications may be made to the invention without deviating from its true spirit and scope, as defined by the following claims.

I claim:

1. In a discrete multi-tone transceiver, a method for reducing peak-to-average power ratio in a transmit signal, comprising the steps of:

interpolating a discrete multi-tone signal to produce an interpolated discrete multi-tone signal;

determining whether a peak magnitude exceeds a pre-determined magnitude parameter, wherein the peak magnitude is associated with either of the discrete multi-tone signal or the interpolated discrete multi-tone signal;

adding a shaping signal to the interpolated discrete multi-tone signal to produce a modified signal, in response to determining that the peak magnitude exceeds the pre-determined magnitude parameter, wherein the shaping signal consists entirely of tones located outside a transmission band allocated to the discrete multi-tone signal;

converting the modified signal to an analog transmit signal; and canceling feedback tones introduced to a receive signal within the discrete multi-tone transceiver, wherein the feedback tones are associated with the shaping signal.

2. A computer readable medium having stored therein instructions for causing a processing unit to execute the method of claim 1.

3. The method of claim 1, wherein the discrete multi-tone transceiver is an asymmetric digital subscriber line modem.

4. The method of claim 1, wherein the step of adding a shaping signal to the interpolated discrete multi-tone signal includes:

generating the shaping signal from a pre-determined shaping function, wherein the shaping signal is centered on a peak in the interpolated discrete multi-tone signal, and wherein the shaping signal consists entirely of tones located outside the transmission band allocated to the discrete multi-tone signal; and adding the shaping signal to the interpolated discrete multi-tone signal to produce a reduced peak magnitude.

5. The method of claim 1, wherein the step of canceling feedback tones comprises:

determining whether the canceling of feedback tones is effective in removing a shaping component associated with the shaping signal; and filtering the analog transmit signal to suppress a shaping component associated with the shaping signal in response to determining that the canceling of feedback tones is not effective in removing the shaping component associated with the shaping signal.

6. The method of claim 1, wherein the step of canceling feedback tones is performed by subtracting an echo cancellation parameter from the receive signal, wherein the echo cancellation parameter is derived at least in part from the modified signal.

7. The method of claim 1, wherein the pre-determined magnitude parameter is derived from a specified peak-to-average ratio parameter.

8. A discrete multi-tone transmitter, comprising in combination:

an Inverse Fast Fourier Transform that transforms transmit signals from a frequency domain to a time domain;

an interpolation unit that interpolates the transmit signals to produce tones located outside a transmission band allocated to the transmit signals;

a shaping signal generator that generates a shaping signal from tones located outside the transmission band allocated to the transmit signals in response to a transmit signal exceeding a pre-determined magnitude parameter;

an adder that adds the shaping signal to the transmit signal exceeding the pre-determined magnitude parameter;

a digital-to-analog converter that converts the transmit signals in the time domain to analog transmit signals;

a filter that suppresses a shaping component from one or more of the analog transmit signals, wherein the shaping component is associated with the shaping signal; and an interface for interfacing the transmitter to a communications medium.

9. The discrete multi-tone transmitter of claim 8, further comprising in combination:

an analog-to-digital converter that converts analog receive signals to receive signals in the time domain; and an echo cancellation unit that cancels feedback tones from the receive signals, wherein the feedback tones are derived at least in part from either of the modified signal or the shaping signal.

10. The discrete multi-tone transmitter of claim 9, wherein the echo cancellation unit subtracts an echo cancellation parameter from the receive signal, wherein the echo cancellation parameter is derived at least in part from the modified signal or the shaping signal.

11. The discrete multi-tone transmitter of claim 8, wherein the shaping signal generator generates the shaping signal from tones located exclusively outside a transmission band allocated to the transmit signals.

12. The discrete multi-tone transmitter of claim 8, wherein the transmission band allocated to the transmit signals is an upstream transmission band in an asymmetric digital subscriber line.

13. The discrete multi-tone transmitter of claim 8, wherein the transmission band allocated to the transmit signals is an downstream transmission band in an asymmetric digital subscriber line.

14. The discrete multi-tone transmitter of claim 8, wherein the pre-determined magnitude parameter is derived from resolution characteristics of the digital-to-analog converter.

* * * * *